United States Patent [19]
Jones et al.

[11] Patent Number: 5,138,472
[45] Date of Patent: Aug. 11, 1992

[54] DISPLAY HAVING LIGHT SCATTERING CENTERS

[75] Inventors: Philip J. Jones, Mulborough, England; Akira Tomita, Redwood City; Mark F. Wartenberg, San Jose, both of Calif.

[73] Assignee: Raychem Corporation, Menlo Park, Calif.

[21] Appl. No.: 653,563

[22] Filed: Feb. 11, 1991

[51] Int. Cl.$^5$ ............................................. G02F 1/13
[52] U.S. Cl. ....................................... 359/52; 359/51; 359/69
[58] Field of Search ....................... 350/339 D, 347 V; 359/51, 69, 52, 98

[56] References Cited

U.S. PATENT DOCUMENTS

| | | | |
|---|---|---|---|
| 3,905,682 | 9/1975 | Meyerhofer | 350/160 LC |
| 3,984,176 | 10/1976 | Hirai et al. | 350/345 |
| 4,435,047 | 3/1984 | Fergason | 350/334 |
| 4,591,233 | 5/1986 | Fergason | 350/334 |
| 4,606,611 | 8/1986 | Fergason | 350/350 R |
| 4,616,903 | 10/1986 | Fergason | 350/347 V |
| 4,648,691 | 3/1987 | Oguchi et al. | 350/338 |
| 4,671,618 | 6/1987 | Wu et al. | 350/350 R |
| 4,673,255 | 6/1987 | West et al. | 350/350 R |
| 4,685,771 | 8/1987 | West et al. | 350/347 V |
| 4,688,900 | 8/1987 | Doane et al. | 350/351 |
| 4,707,080 | 11/1987 | Fergason | 350/334 |
| 4,832,458 | 5/1989 | Fergason et al. | 350/338 |
| 5,088,807 | 2/1992 | Waters et al. | 359/51 |

FOREIGN PATENT DOCUMENTS

| | | |
|---|---|---|
| 0326248A2 | 8/1989 | European Pat. Off. |
| 0005996 | 1/1978 | Japan ............................. 350/339 D |
| WO90/03593 | 4/1990 | PCT Int'l Appl. |

OTHER PUBLICATIONS

Haas, "Scattering Electro-Optic Cells," Xerox Disclosure Journal, vol. 3, No. 5, Sep./Oct. 1978, pp. 333-334.
J. Applied Phys. 62(9); Angular discrimination of light transmission through polymer-dispersed liquid-crystal films; Wu et al.; pp. 3925-3931 (1987).
The Physics and Chemistry of Liquid Crystal Devices; IBM Research Library; pp. 190-194 (1979).

*Primary Examiner*—Stanley D. Miller
*Assistant Examiner*—Anita Pellman Gross
*Attorney, Agent, or Firm*—Yuan Chao; Herb Burkard

[57] ABSTRACT

A display having (a) a first electrode; (b) a second electrode; (c) a display medium positioned between the first and second electrodes, which display medium is switchable between a first state in which incident light is at least one of scattered and absorbed and a second state in which the amount of such scattering and/or absorption is reduced; and (d) scattering centers disposed in front of the second electrode for scattering incident light with a scattering half angle of between about 2 and about 40 degrees when the display medium is in its second state, while permitting at least 10% of the incident light to be transmitted.

15 Claims, 5 Drawing Sheets

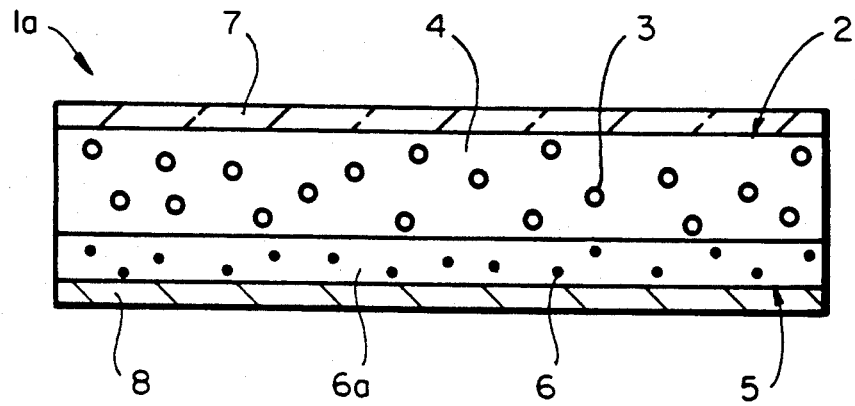
FIG_1a
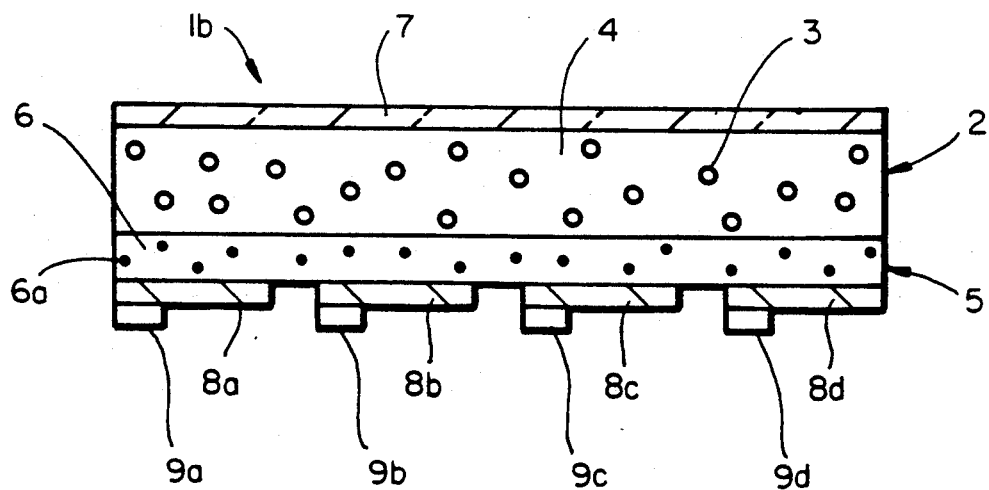
FIG_1b

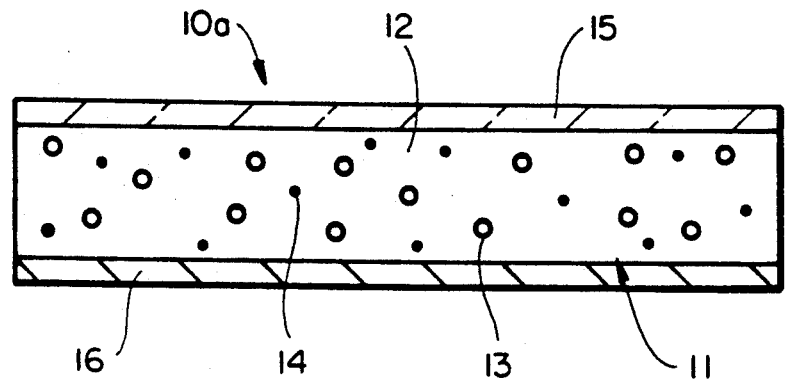
FIG_2a
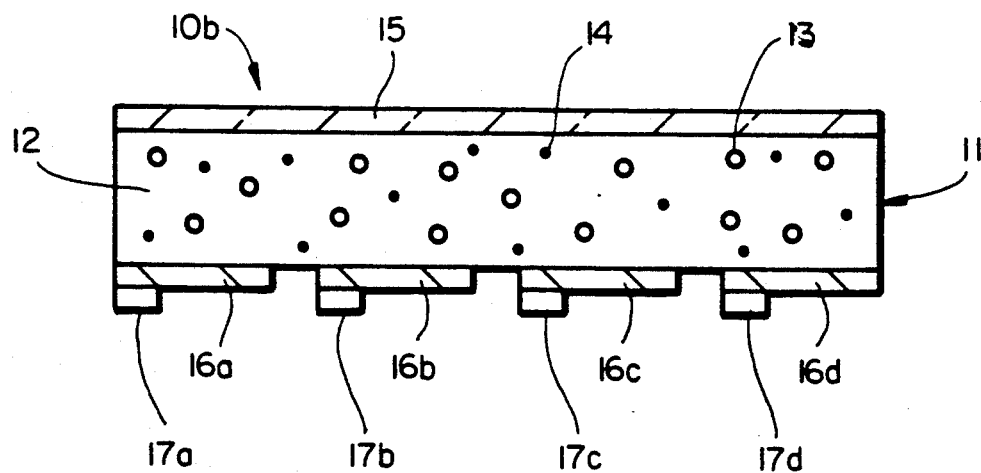
FIG_2b

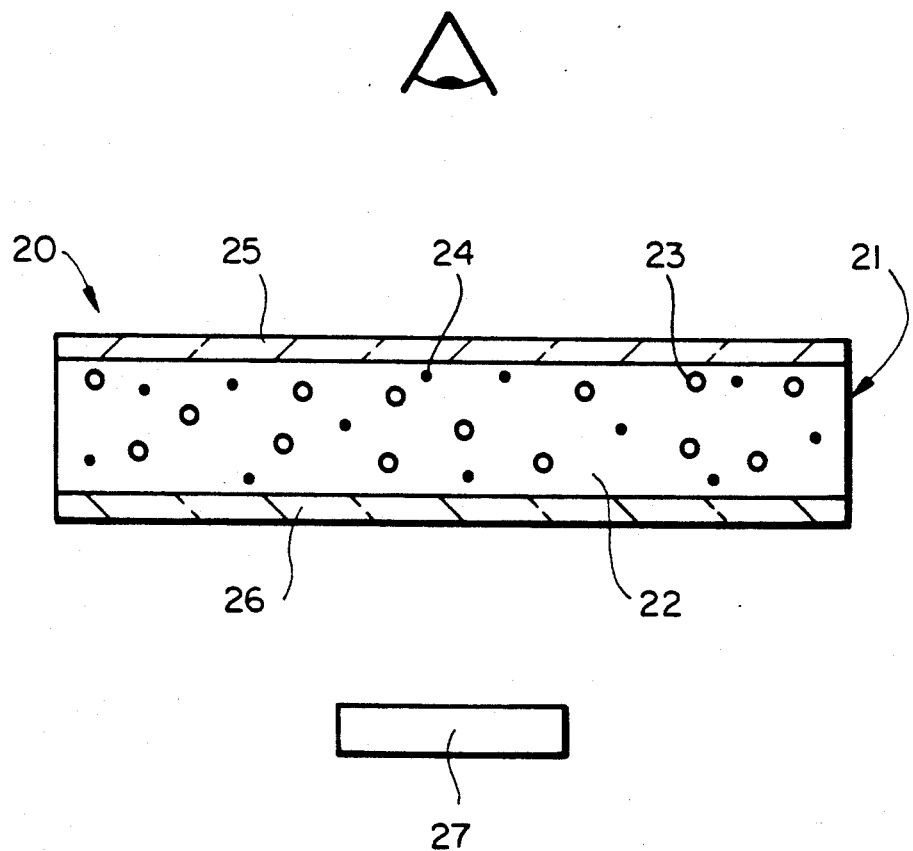
FIG_3

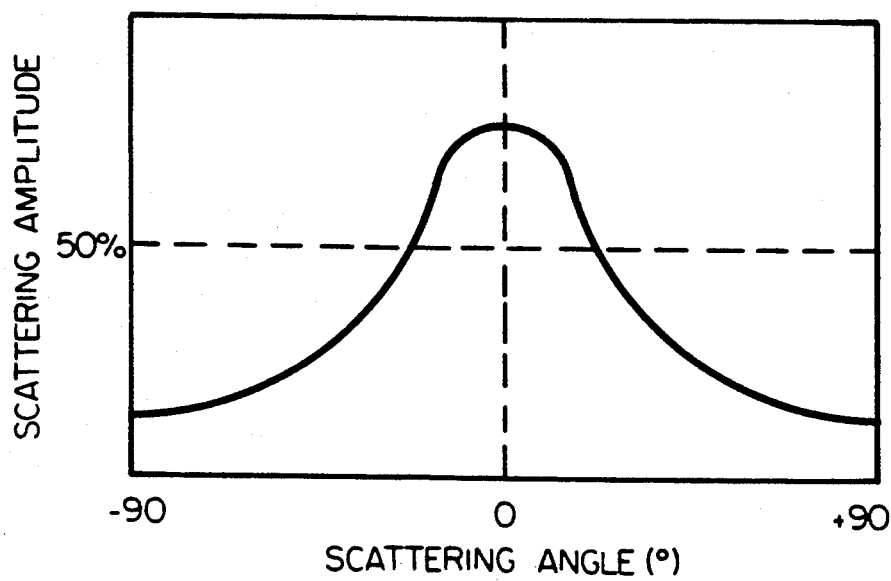
FIG_4a
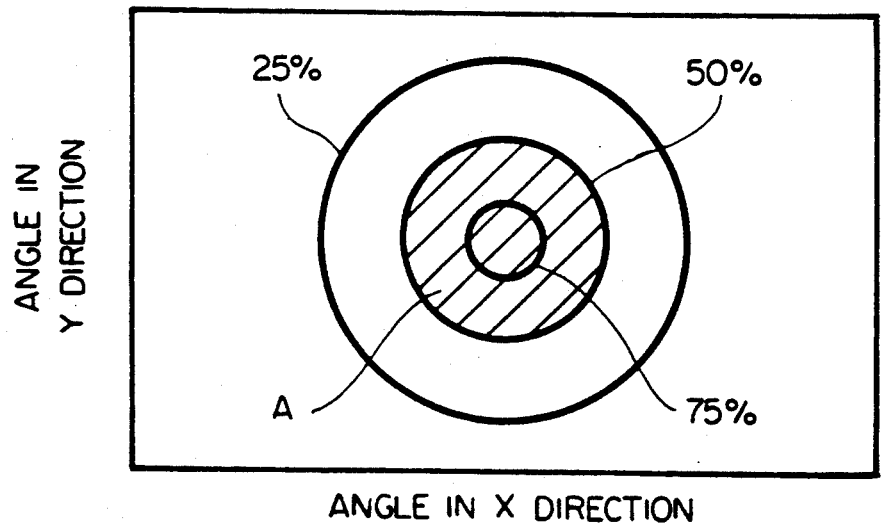
FIG_4b

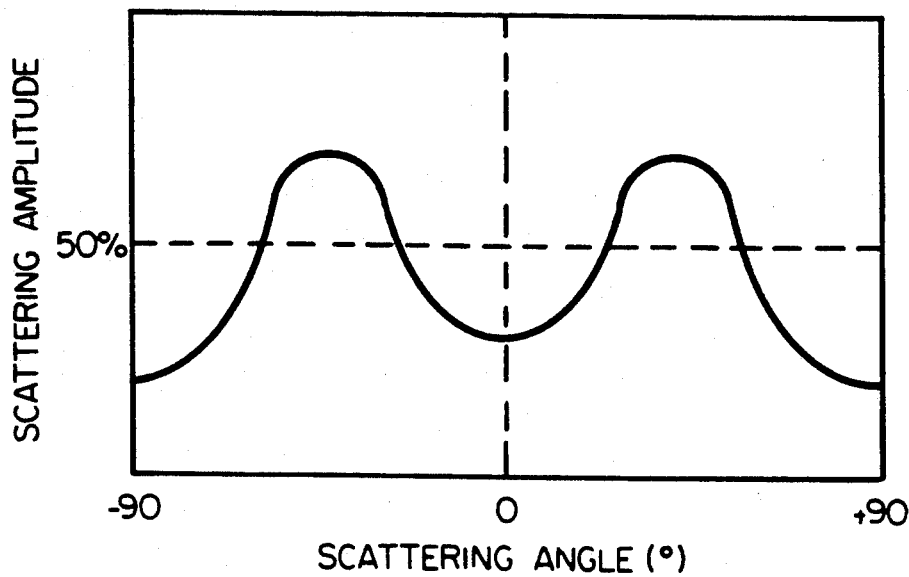
FIG_5a
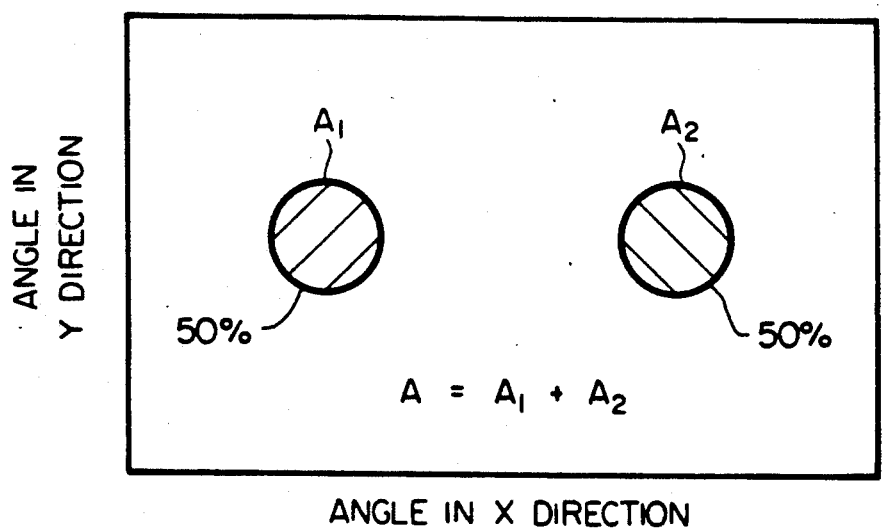
FIG_5b

DISPLAY HAVING LIGHT SCATTERING CENTERS

BACKGROUND OF THE INVENTION

This invention relates to displays having improved viewability.

Displays may be transmissive or reflective. In a transmissive display, the display lies between the viewer and the light source. In a reflective display, the viewer and the light source are on the same side of the display. Many displays are liquid crystal displays, in which the element which transitions between one optical state and a second optical state in response to an input (e.g., an electrical signal) comprises liquid crystal material.

A preferred type of liquid crystal display employs encapsulated liquid crystal material, in which liquid crystals are encapsulated or dispersed in a matrix (or containment medium) which can be, e.g., a polymer. When a voltage corresponding to a sufficiently strong electric field is applied across the encapsulated liquid crystal material (the "field-on" condition), the alignment of the liquid crystals is re-oriented in accordance with the field, so that incident light is transmitted. Conversely, in the absence of such a voltage (the "field-off" condition) the alignment of the liquid crystals is random and/or influenced by the liquid crystal-matrix interface, so that the liquid crystal material scatters incident light. The applied voltage at which the liquid crystal material begins to change from its field-off condition to its field-on condition is called the threshold voltage. If a reflector is positioned behind the display, then a reflective display is obtained, which appears bright in the field-on condition and darker in the field-off condition. If a light source is positioned behind the display, then a transmissive display can be obtained.

Encapsulated liquid crystal displays can include a pleochroic dye in the liquid crystal material to provide light control capabilities through absorption. In the field-on condition, the alignment of the pleochroic dye is determined by the alignment of the liquid crystals (which in turn is determined by the electric field). In this alignment, the absorption of incident light by the dye is at a minimum or substantially reduced, so that a substantial amount of incident light is transmitted. In the field-off condition, the alignment of the pleochroic dye also conforms to the alignment of the liquid crystals (but which are now random or distorted), so that significant light absorption occurs.

Thus, either a reflective or transmissive encapsulated liquid crystal display can be made to appear darker in the field-off condition by the scattering or the absorption of the incident light, or both, and brighter in the field-on condition because scattering and/or absorption is reduced, permitting the incident light to reach the reflector or be transmitted through the display, as applicable.

In reflective displays the reflector can have an important effect on the perceived brightness. At one end of the scale the reflector can be Lambertian, with excellent viewing angle, but low brightness. At the other end of the spectrum would be a specular mirror with viewing angle limited by the surrounding lighting fixtures, but with the brightness of those fixtures.

In a reflective display of the type used in laptop computers, and in particular colored ones, some aperturing of the picture is unavoidable due to the pixel structure. With a Lambertian reflector this leads to excessive light loss. For a specular reflective display obtaining light uniformity and good viewing angles is difficult (e.g., the viewer sees his own reflection in the display). Empirically, some degree of diffusion is needed to produce a pleasing display.

We have invented a display with improved viewability by providing for some residual scattering in the field-on condition.

SUMMARY OF THE INVENTION

A display of this invention comprises a first electrode means; a second electrode means; a display medium positioned between the first and second electrode means, which display medium is switchable between a first state in which incident light is at least one of scattered and absorbed and a second state in which the amount of such scattering and/or absorption is reduced; and plural scattering centers for scattering incident light with a scattering half angle of between about 2 and about 40 degrees when the display medium is in its second state, while permitting at least 10% of the incident light to be transmitted. In a preferred embodiment, the second electrode means is reflective, for reflecting light passing through the display medium back through the display medium.

This invention also provides a liquid crystal display medium switchable between a first state in which incident light is at least one of scattered and absorbed and a second state in which the amount of such scattering and/or absorption is reduced in the presence of a sufficient electric field, comprising a containment medium; discrete volumes of liquid crystals dispersed in the containment medium; and plural scattering centers dispersed in the containment medium for scattering incident light with a scattering half angle of between about 2 and about 40 degrees when the display medium is in its second state, while permitting at least 10% of the incident light to be transmitted.

BRIEF DESCRIPTION OF THE DRAWING(S)

FIGS. 1a and 1b depict reflective displays having a layer of scattering particles between the display medium and the reflector means.

FIGS. 2a and 2b depict reflective displays having scattering centers dispersed in the display medium.

FIG. 3 depicts a transmissive display according to this invention.

FIGS. 4a–b and 5a–b illustrate schematically some possible scattering patterns of displays of this invention.

DESCRIPTION OF THE PREFERRED EMBODIMENTS

A preferred display medium is encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium or matrix. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds. Preferably, the liquid crystals are nematic or operationally nematic. More preferably, they also have a positive dielectric anisotropy.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol) and poly(vinyl alcohol) copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

Typically, encapsulated liquid crystal material is substantially non-transparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

Pleochroic dyes can be mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination also provides a means for the controlled attenuation of light. Generally, the pleochroic dye is in a substantially more light absorbing state in the field-off condition and in a substantially more light transmissive state in the field-on condition. (Thus, as used herein, the term "liquid crystals" also means, in context, liquid crystals containing pleochroic dye dissolved therein.) Pleochroic dyes may be used in encapsulated liquid crystals to form colored displays. Thus, a display capable of displaying colored images can be formed by depositing side by side red, blue, and green pixels.

The scattering centers can be solid particles, such as particles of titanium dioxide. Other suitable particulate scattering centers include alumina, silica, other metallic oxides, hollows spheres (of a material such as glass), glass beads, and the like. Additionally, the scattering centers can comprise gas bubbles dispersed in a matrix material such as a polymer. The scattering centers preferably have an average diameter of between 0.05 and $5\mu$, more preferably between 0.2 and $1\mu$. In two alternative preferred embodiments, particulate scattering centers are positioned as a layer between the display material (held in place by a binder, if desirable) and the second electrode or dispersed in in an encapsulated liquid crystal display medium. Preferably, the particulate scattering centers are not wetted by the liquid crystals, so that they are not resident inside the liquid crystal droplets.

Alternatively, the scattering centers can droplets dispersed in the containment medium of the encapsulated liquid crystal display medium. These droplets can be chosen such that the refractive index of the liquid scattering centers is mismatched (meaning a refractive index differential of at least 0.01, preferably at least 0.05) compared to the refractive index of the containment medium and/or the ordinary refractive index of the liquid crystal droplets, or such that they change from a non-scattering state to a scattering one upon the application of a sufficient electric field to switch the display from the "field-off" to the "field-on" condition. Examples include droplets of: silicon oil, a different liquid crystal material such as smectic or cholesteric liquid crystals, another nematic liquid crystal material, if it has a high threshold voltage, a negative dielectric anisotropy, or an ordinary refractive index substantially different from that of the optically switching liquid crystals. Latex particles can also be used. If a smectic liquid crystal is used, it is preferred that it forms a highly scattering focal conic texture, for example a smectic A liquid crystal. If a cholesteric liquid crystal is used, it is preferably a low pitch one, which forms focal conic textures or highly scattering "onion skin" textures.

Referring now to the figures, FIG. 1a depicts a display 1a having a display medium 2 comprising droplets of liquid crystals 3 dispersed in a containment medium 4. Behind display medium 2 (preferably immediately adjacent to and in contact therewith) is a layer 5 of scattering centers 6, for example titanium dioxide particles, held in place by a binder 6a (for example a polymer or silica gel). Sandwiching display medium 2 and layer 5 are electrodes means 7 and 8 for applying a voltage, which when greater than the threshold voltage, causes display medium 2 to switch from one optical state to the other. Electrode means 8 can be reflective, for example a thin film of aluminum or other reflective material such as silver or a multilayer dielectric stack, for reflecting light passing through display medium 2 and back therethrough, to make a reflective display. The scattering centers 6/binder 6a combination can be deposited onto electrode means 8 by spin coating. Electrode means 7 can be made of a transparent conductive material such as indium tin oxide (ITO).

In FIG. 1b, a similar display 1b is shown (like numerals referring to like elements in FIGS. 1a and 1b). Display 1b differs from display 1a in that the rear electrode means, instead of being monolithic, comprises a plurality of smaller electrodes 8a–d. Such a construction is preferred where the display is intended to display a variable image, ranging from text to graphics, formed from the combination of a large number of pixels, each in the appropriate "on" or "off" state. Each of electrode means 8a–d can apply an electric field to the display material above it, thereby defining a pixel. Each of electrode means 8a–d can be individually controlled by switching means 9a–d such as a varistor, as described in copending commonly assigned applications nos. 07/520,590, filed May 8, 1990, of Thompson et al. and 07/520,685, filed May 8, 1990, of Becker et al. Other suitable switching means 9a–d include thin film transistors (TFT's), diodes, and metal-insulator-metal constructions (MIM's). As in the instance of electrode means 8 in FIG. 1a, electrode means 8a–d can be reflective, to make display 1b a reflective display.

FIGS. 2a and 2b depict embodiments of the invention in which the scattering centers are dispersed inside the display medium. In FIG. 2a, display 10a comprises a display medium 11 having a polymer matrix 12 containing dispersed or otherwise distributed therein droplets of operationally nematic liquid crystals 13 and scattering centers 14. Sandwiching display medium are electrode means 15 and 16, which can be of construction similar to electrode means 7 and 8 in FIG. 1.

FIG. 2b depicts a display 10b which is similar to display 10a (like numerals referring to like elements), except that the rear electrode means comprises a plurality of electrode means 16a–d, analogously to electrode means 8a–d in FIG. 1a. As in the case of FIGS. 1a–b, electrode means 16a–d can be reflective.

FIG. 3 shows a transmissive display according to this invention. Display 20 comprises a display medium 21 having a polymer matrix 22 containing dispersed droplets of operationally nematic liquid crystals 23 and scattering centers 24. In front of display medium 21 is transparent electrode 25. Behind display medium 21 is a transparent electrode 26, made for example of ITO. Light source 27 provides the viewing light for the display. Light from source 26 is transmitted through electrode 25 and 26 and display medium 21, but is scattered by centers 24 to provide more comfortable viewing. The scattering caused by the scattering centers can be used to hide details of light source and to render the brightness of the display more uniform. Collimated light, for example from a parabolic mirror, can be used.

The degree of scattering imparted by the scattering centers should correspond to a scattering half angle between about 2 and about 40 degrees, preferably between about 10 and about 20 degrees, more preferably between 15 and 20 degrees. The scattering half angle ($\theta_s$) means the square root of $A/\pi$:

$$\theta_s = (A/\pi)^{\frac{1}{2}}$$

where A (in units of (degree)$^2$) is the area enclosed by the 50% contour(s), such area A corresponding to the area(s) within which the scattering is greater than 50% of the maximum.

In many instances the scattering is symmetric, in which case the 50% contour will be centrosymmetric, but this is not necessarily so, and asymmetric scattering and/or multiple scattering maxima, and consequently asymmetric 50% contours can occur. FIG. 4a shows the scattering diagram for a symmetric, unimodal, scattering situation. In such an instance, the 50% contour defines an approximately circular area A, as shown in FIG. 4b. However, where the scattering is bimodal and/or asymmetric, as shown in FIG. 5a, then there are multiple areas $A_1$ and $A_2$ defined by the 50% contours, as shown in FIG. 5b, and A is their sum.

The scattering centers should be not so scattering such that they prevent incident light from reaching the reflector (in the instance of a reflective display) or prevent light from the light source from reaching the viewer (in the instance of a transmissive display). The scattering centers should permit at least 10%, preferably at least 30% of the light impinging on them to be transmitted.

The scattering by the scattering centers of this invention provide for a more pleasing display. If the degree of scattering is too low, i.e., as in prior art displays having a highly specular reflector and no scattering centers as taught in this invention, then the mirror-like reflections are not sufficiently suppressed. This effect is to some extent dependent on the size of the display. A small display, for example about 4 inches diagonal, can tolerate a lower degree of scattering than a larger display, for example about 14 inches diagonal, because the amount of structure seen in the reflector is likely to be much less.

This invention provides several advantages. The brightness is improved over a wider range of viewing angles than with a specular mirror which is only bright when the eye sees the images of the light sources in the room. Glare from the light sources is reduced, making display appearance (contrast, brightness, etc.) less dependent on the exact viewing angles and placement of the light sources in the room. However, this does not mean that the higher the degree of scattering, the better the viewability of the display—rather, the degree of scattering should be within the ranges taught herein. If the degree of scattering is too high, then high angle scattered light is trapped in the display, to be absorbed by any pleochroic dye present, and the optical gain is too low for most viewing purposes.

The practice of this invention can be further understood by reference to the following examples, which are provided by means of illustration, not limitation.

EXAMPLE 1

Silicone oil (5.50 g, refractive index 1.380 at 25° C., Petrarch Systems, Inc., Brystol, Pa.) was emulsified in 12.25 g of a solution of polyvinyl alcohol (Airvol 205, Airproducts and Chemicals, Inc., King of Prussia, Pa.) in 1:1 ethanol:water solvent to give an emulsion having a number average droplet size of 0.97 μm. Then 10.40 g water was added.

This emulsion (1 part by weight) was blended with a previously prepared emulsion (6 parts by weight, volume average droplet size about 3 μm) of encapsulated nematic liquid crystal material, comprising 60% by weight water, 20% by weight Airvol 205, and 20% by weight positive dielectric nematic liquid crystal (ZLI 3401, Merck GmbH, Darmstadt, Germany) containing 4% by weight pleochroic dye (S344, a black dichroic dye mixture from Mitsui Toatsu Dyes Ltd., Japan).

This blend of emulsions was coated onto aluminum coated polyester film to give a dry film of thickness about 18 μm. An indium tin oxide (ITO) polyester film was laminated under pressure on top of the film to give a reflective liquid crystal cell. This cell initially appeared dark, but with the application of 40 volts the cell lightened up to reveal a scattering mirror-like surface with a scattering half-angle of 3.5 degrees.

EXAMPLE 2

A mixture of 0.1 g hollow glass balls (Eccospheres MC-37, Emerson & Cuming, Canton, Mass.) and 3 g encapsulated liquid crystal emulsion was hand stirred and then vortexed prior to coating. The glass balls had been previously sieved through a 500 mesh screen to eliminate larger, less desirable particle sizes. The liquid crystals were a nematic liquid crystal with positive dielectric anisotropy (ZLI 3401) containing 4% by weight of a pleochroic dye (S344). The liquid crystal emulsion had a volume average droplet size of about 2.5 μm of encapsulated liquid crystals in a 1:2 weight ratio with 10% aqueous poly(vinyl alcohol) (Airvol 205) solution.

The mixture was coated onto aluminized Mylar poly(ethylene terephthalate) to give a dry film of about 20 μm thick. An indium tin oxide (ITO) coated polyester film was then laminated on top, with the ITO facing the film, under pressure to give a reflective liquid crystal display cell. The cell initially appeared dark, but with the application of a voltage, the cell lightened to reveal a scattering surface. The brightness was not as high as in the cell of Example 1, possibly due to the wide range of particle sizes incorporated into the emulsion and/or the very low refractive index of air in the hollow spheres.

What is claimed is:

1. A display comprising:
   a first electrode means;
   a second electrode means;
   a display medium positioned between the first and second electrode means, which display medium is switchable between a first state in which incident light is at least one of scattered and absorbed and a second state in which the amount of such scattering and/or absorption is reduced; and
   plural scattering centers for scattering incident light with a scattering half angle of between about 2 and about 40 degrees when the display medium is in its second state, while permitting at least 10% of the incident light to be transmitted.

2. A display according to claim 1, wherein the display medium comprises positive dielectric anisotropy, operationally nematic liquid crystals dispersed in a containment medium.

3. A display according to claim 2, wherein the liquid crystals contain a pleochroic dye.

4. A display according to claim 1, 2, or 3, wherein the scattering centers are disposed in a layer between the display medium and the second electrode means.

5. A display according to claim 4, wherein the second electrode means is reflective, for reflecting light passing through the display medium back through the display medium.

6. A display according to claim 4, wherein the second electrode means is transparent.

7. A display according to claim 4, wherein the scattering centers are selected from the group consisting of titanium dioxide, alumina, and other metal oxides; and silica.

8. A display according to claim 2 or 3, wherein the scattering centers are dispersed in the containment medium.

9. A display according to claim 8, wherein the second electrode means is reflective, for reflecting light passing through the display medium back through the display medium.

10. A display according to claim 8, wherein the second electrode means is transparent.

11. A display according to claim 6, wherein the scattering centers are selected from the group consisting of particles of titanium dioxide, alumina, and other metal oxides; silica particles; hollow spheres; glass beads; gas bubbles; silicone oil droplets, smectic liquid crystal droplets, droplets of operationally nematic liquid crystal having a negative dielectric anisotropy; latex particles; and cholesteric liquid crystal droplets.

12. A liquid crystal display medium switchable between a first state in which incident light is at least one of scattered and absorbed and a second state in which the amount of such scattering and/or absorption is reduced in the presence of a sufficient electric field, comprising:
   a containment medium;
   discrete volumes of liquid crystals dispersed in the containment medium; and
   plural scattering centers dispersed in the containment medium for scattering incident light with a scattering half angle of between about 2 and about 40 degrees when the display medium is in its second state, while permitting at least 10% of the incident light to be transmitted.

13. A liquid crystal display medium according to claim 12, wherein the liquid crystals are positive dielectric anisotropy, operationally nematic liquid crystals.

14. A liquid crystal display medium according to claim 13, wherein the liquid crystals contain a pleochroic dye.

15. A liquid crystal display medium according to claim 12, 13, or 14, wherein the scattering centers are selected from the group consisting of particles of titanium dioxide, alumina, and other metal oxides; silica particles; hollow spheres; glass beads; gas bubbles; silicone oil droplets, smectic liquid crystal droplets, droplets of operationally nematic liquid crystal having a negative dielectric anisotropy; latex particles; and cholesteric liquid crystal droplets.

* * * * *